Feb. 11, 1964
W. M. PELINO
3,120,936
HOT-BOX DETECTOR
Filed Sept. 25, 1959
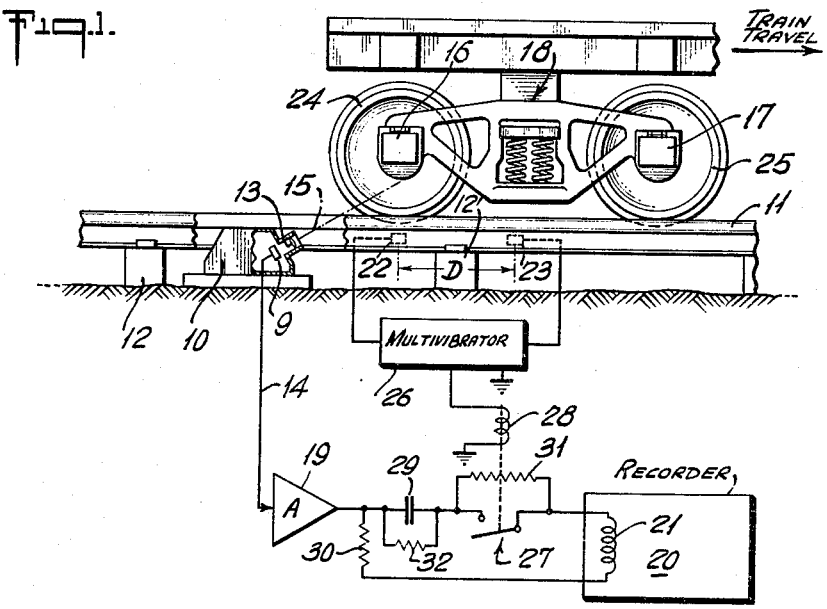
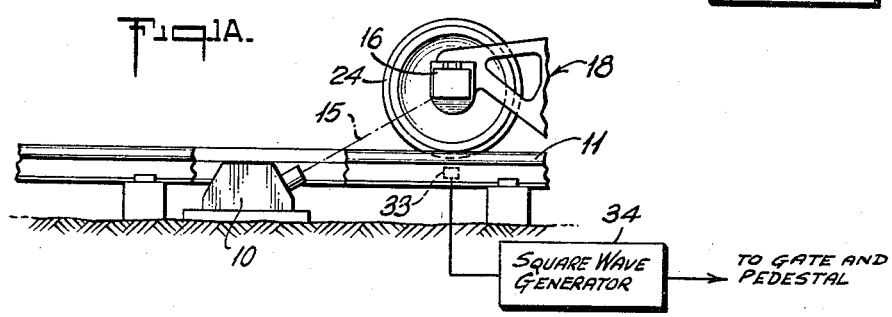
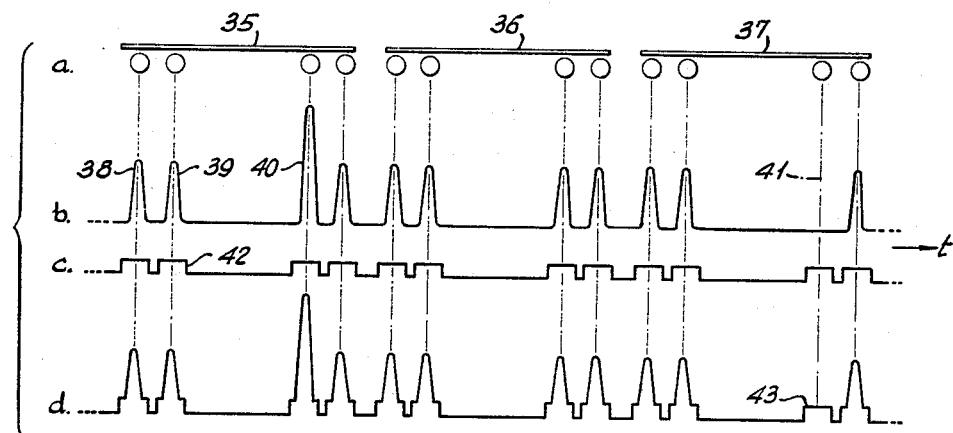
INVENTOR
WILLIAM M. PELINO
BY
ATTORNEYS

United States Patent Office 3,120,936
Patented Feb. 11, 1964

3,120,936
HOT-BOX DETECTOR
William M. Pelino, Garden City, N.Y., assignor to Servo Corporation of America, New Hyde Park, N.Y., a corporation of New York
Filed Sept. 25, 1959, Ser. No. 842,339
1 Claim. (Cl. 246—169)

My invention relates to an infrared hot-box detector system and incorporates improvements over the disclosure of Patent No. 2,880,309, issued March 31, 1959, to Gallagher et al.

With infrared hot-box detector systems as disclosed in said patent, it sometimes occurs that, even though a journal box passes the field of view of the detector, it does not radiate enough energy (in contrast to the background) to develop a signal unique to that particular journal box; such boxes are "missed" by the detector. "Misses" may occur in cold weather, in the presence of drifting snow or in the event of journal boxes shrouded in ice, or in the event that the train has only just started and that there has been insufficient heat developed in the journal to manifest itself as radiation from the journal boxes. Nevertheless, the train may contain a real or a potential hot box and if certain journal boxes have been "missed" by the detector for one or more of the above reasons, it becomes difficult if not impossible accurately to count axles to identify the journal box which is a source of trouble.

It is, accordingly, an object to provide an improved hot-box detector system which will avoid the above-noted difficulties.

A specific object is to provide an improved hot-box detector system wherein the passage of each wheel will develop a signal to be effectively added to the detector output so that, in the event the detector "misses" a given journal box, the resultant signal will carry some indication of the passage of the axle, thereby making possible an accurate axle count.

Other objects and further features of novelty and invention will be pointed out or will occur to those skilled in the art from a reading of the following specification in conjunction with the accompanying drawings, in which:

FIG. 1 is a simplified diagram illustrating mechanical, optical and electrical components of a hot-box detector system;

FIG. 1A is a fragmentary diagram similar to FIG. 1 but illustrating a modification; and FIG. 2 is a diagram graphically displaying, separately and in combination, electrical functions of time in the operation of the hot-box detector system of the invention.

Briefly stated, my invention contemplates avoiding the above-noted difficulties occasioned by the detector "missing" one or more journal boxes, by automatically injecting or effectively adding to the detector output signal a fixed voltage pulse unique to each passing wheel. The added voltage may be positive or negative with respect to the detector signal voltage, so that use of the term "adding" will be understood to refer to algebraic addition. When the combined signals are supplied to suitable display means such as a moving-pen chart recorder, a step-type record appears for each axle, and the heat impulse unique to the corresponding journal box is added to that step. Thus, if the detector "misses" a journal box, the step alone will be displayed and an accurate axle count may be taken, to pin-point any hot box or boxes that may have been developed on a given train.

Referring to FIG. 1 of the drawing, my invention is shown in application to a detector system of the type described in said patent. Thus a detector unit 9 contained within the scanner housing 10 may be fixedly mounted alongside one of the rails 11 of a length of railroad track. In this connection, the scanner may be set upon or between cross ties, as between the ties 12—12'.

The detector unit 9 includes an infrared-sensitive cell, such as a thermistor bolometer, producing an electrical output signal in line 14 in response to incident radiation. Optics, such as an infrared transmitting lens 13 (as of arsenic trisulfide glass), image the detector cell along a sighting axis 15 which is upwardly inclined with respect to the horizontal plane of the track and which is also directed generally in the longitudinal direction of the track. Axis 15 is so directed that upon the passage of railroad rolling stock, the detector cell will be imaged on corresponding sides of each journal box, such as the successive boxes 16—17 of the truck 18 shown on the track 11.

The output of the detector cell is fed by line 14 to signal-processing means including amplifier 19, the output of which is connected to a recorder 20. The recorder 20 may be of the moving-pen galvanometer type having an excitation coil 21 to actuate the pen, and it may develop a continuous trace on a continuously moving chart (not shown) as will be understood.

In order to identify the instant at which the detector cell is imaged on the side of each journal box, I employ in FIG. 1 two wheel trips 22—23 each of which is secured to rail 11 and each of which produced an electrical signal as the flange of each wheel 24—25 passes over. Such wheel trips are described in greater detail in copending Gallagher et al. application Serial No. 627,330, filed December 10, 1956, now abandoned. In the form shown, the spacing D between wheel trips 22—23 is such as to define a wheel-travel distance during which the detector will assuredly "see" the part of the journal box to be inspected, and the two wheel-trip signals are used to operate a gate, thereby effectively excluding any undesired detector video signal. For this purpose, a bi-stable multivibrator 26 is connected to both wheel trips 22—23 in order to develop a square wave, for gate actuation. In the form shown, the connection of amplifier 19 to recorder 20 includes a coupling capacitor 29 and relay contact 27 actuated by coil 28 to pass only the gate signal.

According to the invention, the wheel-trip means 22—23—26 performs an additional function during the gating interval, namely, that of transiently injecting into the signal which is ultimately passed to the recorder 20 a fixed voltage which is unique only to wheel passage. This may be accomplished by transient variation of bolometer bias, or by one or more of the summing techniques to those skilled in the art, but in the form shown this voltage is injected or effectively added by the closing action of contact 27. The amplifier 19 is shown to present its output across a resistor 30, and, in the event of a cathode-follower output, by way of example, the voltage level across this resistor 30 may be in the order of 100 volts D.-C.

A resistor 31 is placed across the relay contact 27, and another resistor 32 is placed across the coupling capacitor 29. The resistors 31—32 then constitute, in conjunction with the resistance of the recorder winding 21, a voltage divider placing a constant fraction of the amplifier cathode voltage across the recorder coil. Now, when a wheel actuates the trip means 22—23—26, the relay contact 27 is transiently closed, thereby shorting out the resistor 31 and injecting into the voltage supplied to the recorder 20 a transient square wave or step function. I prefer that the resistor 31 shall approximate the resistance of recorder winding 21 and that shunt resistance 32 across the coupling capacitance 29 shall be large compared to resistance at 31 and 21. This assures that a small portion of the D.-C. voltage across the cathode resistor 30 will be applied to the recorder upon each closure of contact 27, and further assures that the D.-C. component of voltage across the capacitor 29 will not change rapidly. If the detector 10 "sees" a heat signal on this journal box for the particular wheel which closes the contact 27, this heat signal will be a transient voltage pulse transmitted by the capacitor 29, being effectively algebraically added to the wheel-identifying square wave or step function.

FIG. 1A illustrates a slight modification involving the use of a single wheel-trip device 33 utilized to actuate a square-wave generator 34, such as a single-stability multivibrator, in place of the two trips 22—23 and bi-stable multivibrator 26 of FIG. 1. Other parts remain the same as previously described and are therefore given the same reference numerals.

The action of my invention will be understood by reference to the graphs of FIG. 2. On the axis $a$, I schematically illustrate three successive cars 35—36—37 on a given train, there being small circles to suggest spaced pairs of wheels at the ends of each car. Curve $b$ shows a typical video-output signal of the detector amplifier 19, as would appear across the output resistor 30. This curve shows first and second normal voltage pulses 38—39 of the journal boxes inspected at one end of car 35, and an abnormally large detector signal 40 for the third axle inspected on car 35. Remaining signals are normal for cars 36—37, until the next-to-the-last axle of car 37, at which location the designation 41 indicates that the detector "missed" the journal box.

In curve $c$, I illustrate the step introduced by wheel-trip action, whether it be the form of FIG. 1 or that of FIG. 1A, and it will be noted that regardless of detector "misses," a separate step function is recorded (as at 42 for the wheel axis 39) unique to every passing wheel. These step functions would be recorded at 20 if the detector 10 failed to produce an output signal for any journal box.

In curve $d$, I illustrate the type of signal appearing on the recorder chart by reason of the injected step-function voltage, and ti will be noted that the detector output pulses are faithfully added to the step function pulses, without any noticeable degrading of either of these pulses.

It is to be particularly noted that, for the "miss" associated with the axle 41, a clear mark 43 is established on the chart record so that a continuous count of all axles, from the car 37 to the hot box at 40 on car 35 may be accurately made.

While the invention has been shown and described in conjunction with preferred forms, it will be understood that modifications may be made within the scope of the claim which follows.

I claim:

A railroad hot-box detector, comprising in combination a length of railroad track, a railroad vehicle having an axle and wheels on said track, journal boxes on the ends of said axle, a detector unit fixedly mounted alongside and outside said track and having an infrared-sensitive cell element producing an electrical output in response to incident infrared radiation, an optical system imaging said cell element in the path traced by one of said boxes upon movement of said vehicle along said track, wheel-trip means mounted adjacent one of the rails of said track and developing an electrical synchronizing signal in response to the passage of each wheel past said wheel-trip means, said wheel-trip means being so positioned with respect to said detector unit that said wheel-trip means is operated when said cell is imaged on the journal box associated with the wheel currently responsible for wheel-trip operation, signal-processing means connected to said cell and including a gate with an actuating connection to said wheel-trip means, fixed-voltage injection means also operated by said wheel-trip means for transiently effectively algebraically adding a fixed-voltage signal to the video-output signal of said cell only during operation of said wheel-trip means, and recorder means connected for response to said added signals.

References Cited in the file of this patent

UNITED STATES PATENTS

| | | |
|---|---|---|
| 1,175,628 | Fulshaw | Mar. 14, 1916 |
| 1,471,129 | Holt | Oct. 16, 1923 |
| 2,277,427 | Woodson | Mar. 24, 1942 |
| 2,346,802 | Walker | Apr. 18, 1944 |
| 2,880,309 | Gallagher et al. | Mar. 31, 1959 |

FOREIGN PATENTS

| | | |
|---|---|---|
| 69,401 | France | July 15, 1958 |